United States Patent [19]

Stoss

[11] Patent Number: 4,936,743
[45] Date of Patent: Jun. 26, 1990

[54] HYDRAULICALLY CONTROLLED GRIPPER TOOL

[75] Inventor: Johannes Stoss, Nuremberg, Fed. Rep. of Germany

[73] Assignee: Siemens Aktiengesellschaft, Munich, Fed. Rep. of Germany

[21] Appl. No.: 325,132

[22] Filed: Mar. 16, 1989

[30] Foreign Application Priority Data

Mar. 16, 1988 [DE] Fed. Rep. of Germany ....... 3808822

[51] Int. Cl.$^5$ .................. B65G 47/91; B25J 15/00
[52] U.S. Cl. .................. 414/740; 294/86.41; 901/39
[58] Field of Search ............ 414/740; 901/37, 39; 294/86.41, 86.4, 104, 88; 376/260

[56] References Cited

U.S. PATENT DOCUMENTS

| 3,123,230 | 3/1964 | Oppenheimer et al. | 901/37 |
| 3,279,624 | 10/1966 | Devol | 901/37 |
| 3,463,226 | 8/1969 | Johnson | 901/37 |
| 3,690,713 | 9/1972 | Ristow | 294/104 |
| 3,840,128 | 10/1974 | Swoboda et al. | 901/37 |
| 3,964,778 | 6/1976 | Jouppi | 294/104 |
| 4,652,195 | 3/1987 | McArthur | 901/39 |
| 4,652,204 | 3/1987 | Arnett | 294/86.4 |
| 4,661,309 | 4/1987 | Hayes | 376/248 |

FOREIGN PATENT DOCUMENTS

| 1180090 | 6/1959 | France | 901/37 |
| 2065423 | 7/1971 | France | |
| 2565881 | 12/1985 | France | |
| 1311927 | 5/1987 | U.S.S.R. | 901/37 |
| 980044 | 1/1965 | United Kingdom | 901/37 |
| 1332667 | 10/1973 | United Kingdom | |

Primary Examiner—David H. Brown
Attorney, Agent, or Firm—Herbert L. Lerner; Laurence A. Greenberg

[57] ABSTRACT

A hydraulically controlled gripper tool for positioning, mounting and retrieving parts in poorly accessible locations and areas, such as in nuclear power plants, includes a support body. A pivot shaft is supported on the support body in a given plane. A bracket is supported on the pivot shaft and a tilting shaft is supported on the bracket in the given plane. A basic tool body is supported on the tilting shaft. An actuation cylinder is disposed on the basic tool body and gripper jaws are connected to the actuation cylinder for closing and opening the gripper jaws. Another cylinder is rotatably disposed on the support body with a piston guided in the other cylinder and a universal joint connected to the piston. A tilting lever has one end rotatably connected to the universal joint and another end locked on the basic tool body for tilting the gripper jaws. A further cylinder is rotatably disposed on the support body and another piston is guided in the further cylinder. A joint eccentrically disposed on the bracket is connected to the other piston for pivoting the gripper jaws.

7 Claims, 4 Drawing Sheets

HYDRAULICALLY CONTROLLED GRIPPER TOOL

The invention relates to a hydraulically controlled gripper tool that can be used for positioning or mounting parts in poorly accessible locations and/or retrieving parts from poorly accessible areas.

Equipment is known from robot and handling equipment technology in which a workpiece can be handed over or picked up vertically from above. When a manipulator of this kind is used in nuclear power plants, it is very difficult to observe the positioning or retrieval process, which is performed by remote control, and if the surroundings are dark and additional lighting is required, then the resultant shadows and reflections make observation virtually impossible.

It is accordingly an object of the invention to provide a hydraulically controlled gripper tool, which overcomes the hereinafore-mentioned disadvantages of the heretofore-known devices of this general type, which may be used in poorly accessible areas, which is small in structural size but exerts major positioning forces, which is movable in three planes at right angles to one another, and which can be finely controlled.

With the foregoing and other objects in view there is provided, in accordance with the invention, a hydraulically controlled gripper tool for positioning, mounting and retrieving parts in poorly accessible locations and areas, in particular in nuclear power plants, comprising a support body, a pivot shaft supported on the support body in a given plane, a bracket supported on the pivot shaft, a tilting shaft supported on the bracket in the given plane, a basic tool body supported on the tilting shaft, an actuation cylinder disposed on the basic tool body, gripper jaws connected to the actuation cylinder for closing and opening the gripper jaws; another cylinder rotatably disposed on the support body, a piston guided in the other cylinder, a universal joint connected to the piston, a tilting lever having one end rotatably connected to the universal joint and another end form-lockingly connected to the basic tool body for tilting the gripper jaws; a further cylinder rotatably disposed on the support body, another piston guided in the further cylinder, and a joint eccentrically disposed on the bracket and connected to the other piston for pivoting the gripper jaws.

In this way, the pivoting and inclination radius is restricted to only the gripper jaws, which form tongs, so that a very small amount of space is required for pivoting and inclining the gripper jaws. The process of positioning or retrieving parts can be visually monitored from above or from the side in a simple manner.

In accordance with another feature of the invention, there is provided a lever configuration, and a pivot point on the basic tool body, one of the gripper jaws being form-lockingly connected to the basic tool body and the other of the gripper jaws being supported at the pivot point and connected to the actuation cylinder through the lever configuration.

In order to protect against external influences, in accordance with a further feature of the invention, the support body is a housing surrounding at least the actuation cylinder, the other cylinder and the further cylinder.

In order to secure the gripper tool on a rod, vehicle or crane, in accordance with an added feature of the invention, there are provided retaining means disposed on the support body for coupling to the rod, vehicle or crane and permitting simple and rapid fastening.

In order to prevent light from outside from being shaded by the gripper tool, in accordance with an additional feature of the invention, the gripper jaws are disposed at least substantially perpendicular to or obliquely to the given plane.

In accordance with concomitant feature of the invention, one of the two gripper jaws is a pointed wedge rigidly disposed on the basic tool body.

Other features which are considered as characteristic for the invention are set forth in the appended claims.

Although the invention is illustrated and described herein as embodied in a hydraulically controlled gripper tool, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

Figure 1:
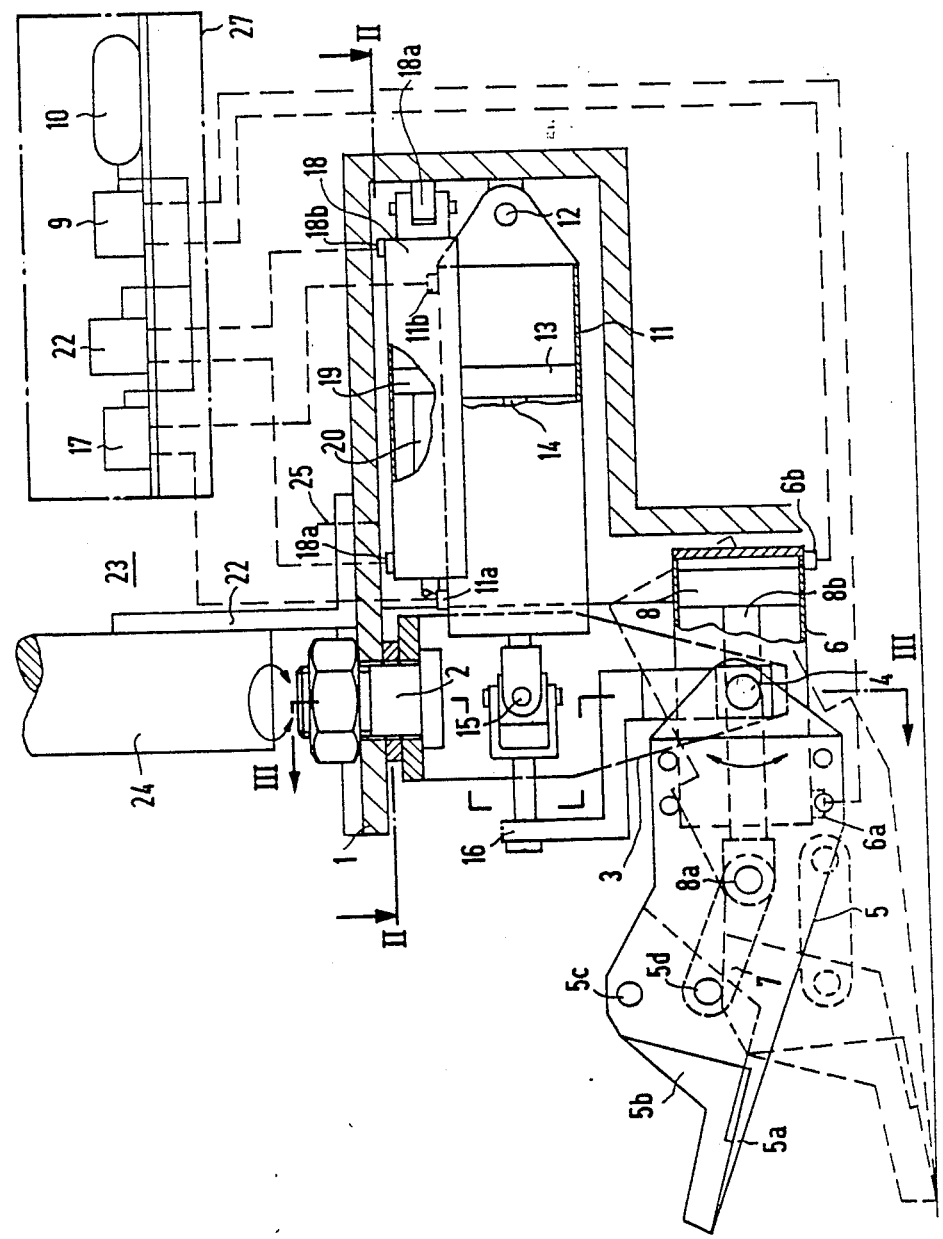
FIG. 1 is a diagrammatic, partly broken-away and partly longitudinal-sectional view of a hydraulically controlled gripper tool disposed on a rod.

Referring now to the figures of the drawing in detail and first, particularly, to FIG. 1 thereof, there is seen a bracket 3 which is rotatably disposed on a support body 1 by means of a pivot bearing 2. A basic tool body 5, which has gripper jaws 5a, 5b, is supported on the bracket 3 at a tilting shaft 4. One gripper jaw 5a has the shape of a very sharply pointed wedge and is form-lockingly connected to the basic tool body. A form-locking connection is one which connects two elements together due to the shape of the elements themselves, as opposed to a force-locking connection, which locks the elements together by force external to the elements. The basic tool body 5 has a U-shaped cross section, and a bearing shaft 5c is disposed on the ends of the legs of the U for rotatingly supporting the other gripper jaw 5b. One end of a lever configuration in the form of a guide rod 7 is rotatable on a shaft 5d of the basic tool body 5, while the other end thereof is connected through a joint 8a to a piston rod 8b of a piston 8 guided in an actuation cylinder 6. The actuation cylinder 6, which is form-lockingly connected to the basic body, has connection fittings 6a, 6b for supplying a pressure fluid. The two connection fittings 6a, 6b communicate through pressure fluid lines and a control device 9 with a pressure fluid container 10.

If pressure fluid acts upon the cylinder through the fitting 6b, the gripper jaw 5b is opened.

A cylinder 11 providing a tilting motion of the gripper jaws 5a, 5b is rotatably supported at a joint 12 on the support body 1. A piston 13 guided in the cylinder 11 is rotatably joined to one end of a tilting lever 16 through a piston rod 14 and a universal or ball joint 15. The other end of the tilting lever 16 is form-lockingly attached to the basic tool body 5. Fittings 11a, 11b which are provided on the cylinder 11, communicate through pressure fluid lines and a control device 17 with the pressure fluid container 10.

If the pressure fluid furnished from the pressure fluid reservoir 10 through the control device 17 is impressed upon upon the cylinder 11, the basic tool body 5 can be tilted, so that the gripper jaws 5a, 5b can be tilted upward or downward by a precisely predeterminable angle, such as into a position shown in broken lines in FIG. 1.

The pivot bearing 2 of the bracket 3 is disposed on the support body 1 in such a manner that the axis of the pivot bearing 2 is in the same plane as the tilting shaft 4 of the tool body.

Figure 2:
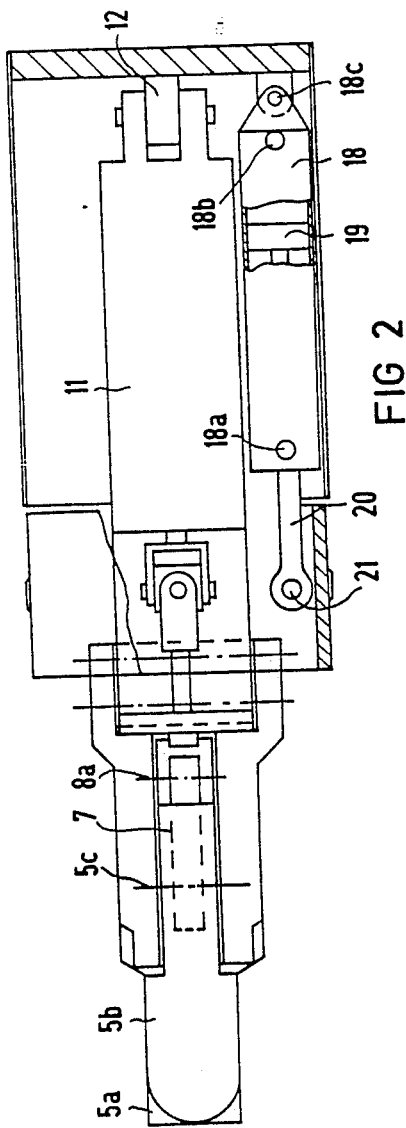
FIG. 2 is a cross-sectional view taken along the line II—II in FIG. 1, in the direction of the arrows.
Figure 3:
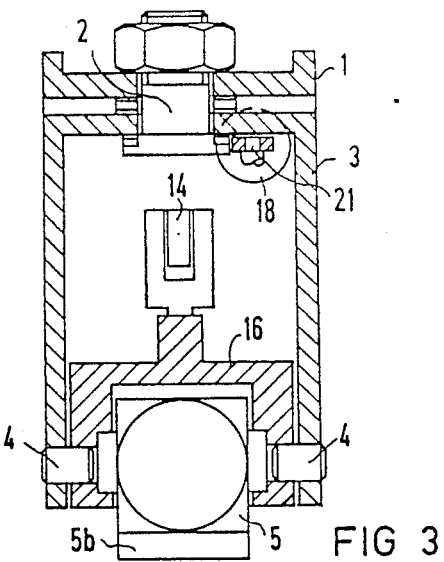
FIG. 3 is a longitudinal-sectional view taken along the line III—III in FIG. 1, in the direction of the arrows.

As best seen in FIGS. 2 and 3, a cylinder 18 is also rotatably disposed on the support body 1 at a pivot point 18c. The cylinder 18 has a piston 19 which is connected through a piston rod 20 with a joint 21 eccentrically disposed on the bracket 3. Due to the placement of the piston 19, the bracket 3 and therefore the basic tool body 5 are rotated with the gripper jaws 5a, 5b about the pivot bearing 2. To this end, the cylinder 18 is provided with connection fittings 18a, 18b, which communicate through pressure fluid lines and a control device 22 with the pressure fluid container 10. The lower gripper jaw 5a has the shape of a flat, pointed wedge and is rigidly connected with the basic tool body 5. As a result, bodies, and in particular flat bodies, are more easily grasped by the gripper tool.

The support body 1 is constructed as a housing which surrounds at least the actuation cylinder 6 and the other cylinders 11, 18.

The control devices 9, 17, 22 are disposed on a control panel 27, which also includes additional devices required for control.

Retaining means 23 are provided on the support body 1 for coupling to a rod 24. These retaining means 23 may be in the form of a cylindrical body that is provided with an angle iron 22 and can be fastened by means of screws 25 to the support body. It is suitable for the gripper jaws 5a and 5b to be disposed at least approximately perpendicular to or obliquely to the plane that is defined by the pivot bearing and the tilting shaft 4.

Figure 4:
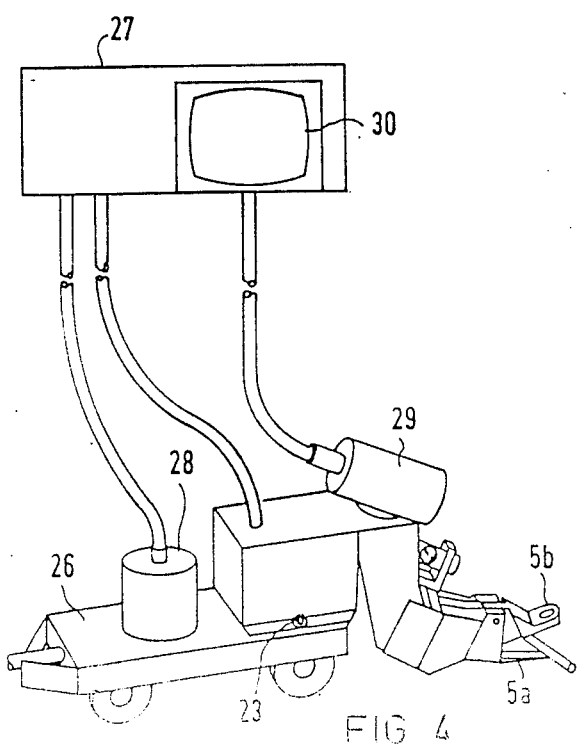
FIG. 4 is a perspective view of a gripper tool coupled to a vehicle.

As FIG. 4 shows, the support body 1 may also be provided with retaining means 23 for coupling to a vehicle 26, so that the gripper tool can be used in mobile fashion, for instance in a pipe or vessel. The vehicle is equipped with a drive motor 28, which is controlled from the control panel 27. A camera 29 is disposed on the gripper tool and connected to a monitor 30 for monitoring.

The gripper jaws 5a, 5b are adapted to the various tasks to be performed, so that various parts, including small parts, can be positioned or retrieved. The controllable pressure fluid drives assure high retaining forces on the parts of the gripper jaws.

Figure 5:
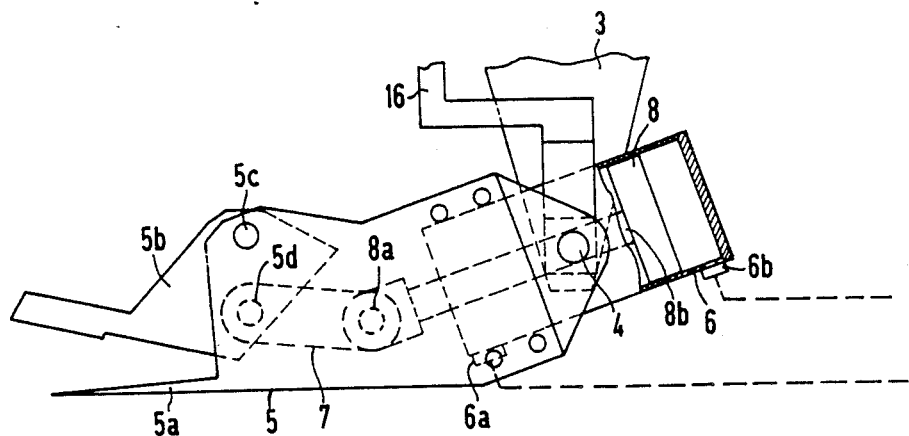
FIG. 5 is a fragmentary, partly broken-away, elevational view of a portion of the gripper tool with the gripper jaws opened.

FIG. 5, which shows the gripper jaws 5a, 5b in the opened position, illustrates an embodiment in which the lower gripper jaw 5a has the shape of a flat, pointed wedge with which even small parts can be picked up.

I claim:

1. Hydraulically controlled gripper tool for positioning, mounting and retrieving parts in poorly accessible locations and areas, comprising:
   (a) a support body, a pivot shaft supported on said support body in a given plane, a bracket supported on said pivot shaft, a tilting shaft supported on said bracket in said given plane, a basic tool body supported on said tilting shaft, an actuation cylinder and a gripper jaw disposed on said basic tool body, and a further gripper jaw connected to said actuation cylinder for closing and opening said gripper jaws;
   (b) another cylinder rotatably disposed on said support body, a piston guided in said other cylinder, a universal joint connected to said piston, and a tilting lever having one end rotatably connected to said universal joint and another end locked on said basic tool body for tilting said gripper jaws; and
   (c) a further cylinder rotatably disposed on said support body, another piston guided in said further cylinder, and a joint eccentrically disposed on said bracket and connected to said other piston for pivoting said gripper jaws.

2. Gripper tool according to claim 1, including a lever configuration, and a pivot point on said basic tool body, one of said gripper jaws being connected to said basic tool body and the other of said gripper jaws being supported at said pivot point and connected to said actuation cylinder through said lever configuration.

3. Gripper tool according to claim 1, wherein said support body is a housing surrounding at least said actuation cylinder, said other cylinder and said further cylinder.

4. Gripper tool according to claim 1, including retaining means disposed on said support body for coupling to a rod.

5. Gripper tool according to claim 1, wherein said gripper jaws are disposed at least substantially perpendicular to said given plane.

6. Gripper tool according to claim 1, wherein one of said gripper jaws is a pointed wedge rigidly disposed on said basic tool body.

7. Gripper tool according to claim 1, including retaining means disposed on said support body for coupling to a vehicle.

* * * * *